United States Patent Office 3,644,540
Patented Feb. 22, 1972

3,644,540
5,7 - DIISOPROPYL-1,1-DIMETHYL-6-HYDROXY-INDAN AND PROCESS FOR PREPARING SAME
Thomas F. Wood, Wayne, and George H. Goodwin, Rutherford, N.J., assignors to Givaudan Corporation, Clifton, N.J.
No Drawing. Continuation-in-part of application Ser. No. 674,103, Oct. 10, 1967. This application July 1, 1968, Ser. No. 741,278
Int. Cl. C07c 39/12
U.S. Cl. 260—626 R                                    1 Claim

ABSTRACT OF THE DISCLOSURE

The novel compound, 5,7-diisopropyl-1,1-dimethyl-6-hydroxyindan, (I), and a process for preparing it, are disclosed. I is a colorless crystalline material, M.P. 99°–100° C., and has a strong and pleasant musk odor, I is suitable for use in perfumery. I also exhibits properties as an antioxidant. I is prepared by reacting 2,6-diisopropylphenol and isoprene, in the presence of sulfuric acid or other alkylating catalysts; at temperatures from −20° to 150° C., depending on the strength of the catalyst.

BACKGROUND OF THE INVENTION

This application is a continuation-in-part of our co-pending application, Ser. No. 674,103, filed Oct. 10, 1967.

So-called musks are widely used in perfumery, mainly for their ability to act as fixatives but also because of desirable odor qualities they impart to perfume formulations. Until about 10 years or so ago, most of the synthetic musk materials were either nitrated hydrocarbons, such as musk xylene, or macrocyclic ketones, lactones or esters, such as cyclopentadecanone, cyclopentadecanolide, and ethylene brassylate. More recently acylated tetrahydronaphthalenes and indans have been introduced as new members in the perfumer's repertory odor notes.

An object of this invention is to make available to the art of perfumery a novel compound which combines fixative and antioxidant properties and is of special value for use in formulations containing unstable aldehydes, which are especially susceptible to oxidation.

Another object is to provide a novel compound of musk-like properties.

A further object is to provide a novel process for making the novel musk and antioxidant compound of this invention in a technically simple and commercially desirable manner, from low cost and readily-available materials.

PRIOR ART

No musk-like properties have been reported with respect to any known compounds, natural or synthetic, having a phenolic hydroxy group in the molecule.

The process of this invention is novel. Condensations of isoprene with phenolic compounds have been reported in the past but these produced different types of compounds Thus, Clemo and Ghatge, J. Chem. Soc., 1955, 4347–9, found that isoprene reacted with phenol in the presence of iodine to produce 2,2-dimethylchroman:

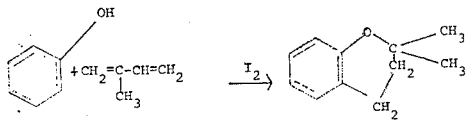

More recently Isagul'yants and Evstaf'ev, Tr. Mosk. Inst. Neftekhim. i. Gaz Prom. No. 51, 105–7 (1964), C.A. 62, 14545C (1965); Ibbid. Zh. Organ. Khim., 1 (1), 102–6 (1965), C.A. 14614 (1965), found that isoprene reacted with phenol and with m-cresol in the presence of a cationic resin to produce up to 75% of monopentenylphenol and 1,1-dimethylchromans.

SUMMARY OF THE INVENTION

The foregoing and other objects of this invention are attained by the novel compound, 5,7-diisopropyl-1,1-dimethyl-6-hydroxyindan, made by reacting 2,6-diisopropylphenol and isoprene, in the presence of a protonic acid catalyst, at temperatures from about −20° C. to about 150° C.

The novel compound of this invention may be represented by its skeletal structural formula as follows:

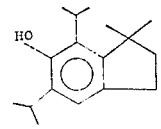

Aside from the fact that no phenolic musk-like compounds have previously been reported, the surprising musk qualities of the novel compound here are further underscored by the fact that available criteria linking chemical structure and musk properties would contra-indicate such properties here. For example, Theimer et al., J. Agr. Food Chem., 15, 6–14 (1967), in their summary of careful and extensive studies on the correlation of structure and musk odor, specifically report that:

"A large group (such as n-propyl or isopropyl) next to the polar group may not only make the cross-sectional area too great, but may often also make the polar end of the molecule so broad that the ratio L/B falls below 2.8. Again, the odorant will not fulfill the requirements."

With respect to our process for preparing the novel compound of this invention, this, too, was surprising in itself, as the aforementioned prior art would indicate that dimethylchromans, and also, perhaps, monopentenylphenols, would result from the reaction of 2,6-diisopropylphenol and isoprene. Certainly, the prior art did not give any indication that an indan derivative would, in fact, result.

The process of this invention may be represented by the following equation:

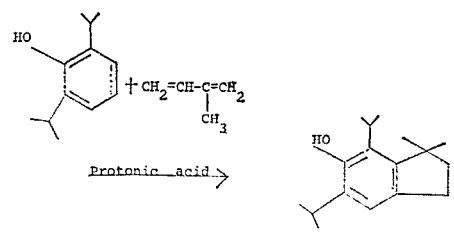

The required 2,6-diisopropylphenol, readily prepared in good yield by the well-known "ortho-alkylation reaction" starting with phenol and propylene, is commercially available. Isoprene is commercially available at low cost.

In general, a mixture of the starting phenol and isoprene is slowly fed into a mixture of more of the starting phenol and the catalyst employed. If desired where a mild protonic acid catalyst is employed, a stronger protonic acid catalyst may also be added at any desired stage of the reaction, in order to bring the reaction to the desired completion more quickly.

In carrying out the above cyclo-addition reaction protonic acidic condensing agents, such as sulfuric acid, phosphoric acid, hydrofluoric acid, boron trifluoride-water adduct, sometimes described as monohydroxy-fluoro boric acid, etc., may be used. Sulfuric acid of 75% strength and stronger has been found effective in the process. When the strength of the sulfuric acid is 85 to 88%, the process is operable between 5 and 50° C. At sulfuric acid strengths of 93–96%, the process is operable between −20 and +35°. When a milder protonic acid alkylating catalyst, such as phosphoric acid, is used, higher temperatures may be employed such as 40 to 150°. An especially effective catalyst is phosphoric acid of about 95% concentration. Anhydrous hydrogen fluoride is an efficient alkylating catalyst within the temperature range of −10 to 50°.

The reaction time required to secure satisfactory yield of the desired product will vary, depending upon the catalyst employed and the temperature at which the reaction is conducted. In general, it has been found that reaction times between about 3 and 6 hours give the desired results. About 3 to 4 hours are required to feed the phenol-isoprene mixture into the phenol-catalyst mixture. Stirring is then continued for from about 10 minutes to 2 hours. It is understood that the stronger the catalyst and the higher the reaction temperature, the shorter will be the reaction period required.

In carrying out the reaction, the proportion of the ingredients may be varied over wide limits.

In general, equimolecular amounts of the starting phenol and isoprene give excellent results. While a slight molar excess of isoprene may be used, this is not recommended, in general, because the excess will be lost through polymerization. If desired, the phenol may be employed in excess, for example, in a molar excess of 3 to 1 of isoprene. An excess of phenol may be desirable when a strong alkylating catalyst, such as sulfuric acid, is used.

With respect to the alkylating catalyst, amounts from about 5 to 55 percent, based on the total amount of 2,6-diisopropylphenol introduced into the reaction vessel, may be used with satisfactory results; but larger or smaller amounts may be employed, if desired.

Since the catalysts used in the process are mainly insoluble in the reaction mixture, it is advisable to provide efficient stirring throughout. After the reaction is completed, the stirring is discontinued and the catalyst may be allowed to separate and is run off and discarded or reused in the process. In order to obtain efficient separation at this stage it is sometimes necessary to add a suitable solvent, such as benzene or ethylene dichloride, which can be recovered by distillation later. Alternatively, the reaction contents may be quenched in ice water after the stirring is discontinued, then allowed to settle and the lower aqueous layer containing the catalyst is removed and discarded.

The compound of this invention has been found to be an effective and useful anti-oxidant for the stabilization of unsaturated acids, such as oleic acid and aldehyde compounds as, for example: p-isopropyl-2-methyl-hydrocinnamaldehyde, nonanal and p-isopropylbenzaldehyde. In addition, the compound is a good stabilizer for olefins as, for example, for myrcene.

It will be understood by perfumers and others skilled in the art that our novel compound can be employed in various formulations and in varying amounts. The amount used will vary, depending on the formulation, the odor effects desired, the desires of the compounds, etc. As a general guide, amounts from 0.1 to 5%, by weight, of the total perfume, can be used to bring out the musk qualities of the compound. As an antioxidant, amounts of the novel compound from about 0.001% to about 0.1%, by weight, of the aldehyde unsaturated acid, olefin or other compound to be stabilized, are useful.

In order more fully to exemplify this invention, the following examples are given by way of illustration, and not by way of limitation. The parts or percentages are by weight, the temperatures are in degrees centigrade, and all melting points and boiling points are uncorrected unless otherwise specified.

EXAMPLE I 5,7-diisopropyl-1,1-dimethyl-6-hydroxyindan
(using 93% $H_2SO_4$)

A solution of 68 g. (1 mole) of isoprene in 100 g. of 2,6-diisopropylphenol was fed over a 3 hour period into a rapidly-stirred mixture of 240 g. of 2,6-diisopropylphenol and 120 g. of 93% sulfuric acid while the reaction temperature was maintained at 25 to 30°. The resulting thick reaction mixture was stirred 10 min. longer and quenched by addition of 300 g. of ice-water. Two hundred ml. of benzene was stirred in to facilitate separation. After settling, the lower acid layer was withdrawn and discarded. The remaining benzene solution was washed successively with water and 10% sodium bicarbonate solution and distilled for removal of the benzene solvent. The residual liquid was vacuum distilled and the fraction boiling from 127° to 132° at 2 mm. collected as a colorless solid amounting to 46 g. After crystallization, first from petroleum ether and then from 90% aqueous ethanol, the product was obtained as colorless crystals, M.P. 99–100°, having a strong and pleasant musk odor.

*Analysis.*—Calc'd for $C_{17}H_{26}O$ (percent): C, 82.87; H, 10.64. Found (percent): C, 82.81; H, 10.75.

EXAMPLE II 5,7-diisopropyl-1,1-dimethyl-6-hydroxyindan
(using 95% $H_3PO_4$)

A solution of 68 g. of isoprene in 178 g. of 2,6-diisopropylphenol was added dropwise over a 4 hour period to a rapidly stirred mixture of 356 g. (2 moles) of 2,6-diisopropylphenol and 50 g. of 95% phosphoric acid at 81 to 82°. The mixture was stirred 60 min. longer at this temperature and allowed to settle. The lower phosphoric acid layer was discarded. The oil layer was washed with 150 ml. of 10% sodium bicarbonate solution and vacuum-distilled. After recovery of 370 g. of 2,6-diisopropylphenol, the desired product was obtained as a fraction, B.P. 115–122° (1 mm.), amounting to 164 g. This material rapidly crystallized in the receiver as it distilled. After being crystallized, first from petroleum ether, then from methanol, and finally once from 90% isopropanol, the product was obtained as a colorless solid, M.P. 98.5–99, having a musk-like odor.

A mixed melting point run with the product of Example I above was 98.5–99.0. The identity was further established by comparison of the infrared spectra. The spectrum of this compound shows the following characteristic bands: 2.80 m., 3.45–3.55 s., 6.88 s., 7.01 s., 7.27 m., 7.36 ms., 7.80 s., 7.97 m., 8.28 s., 8.40 s., 8.82 s., 9.08 m., 9.31 s., 10.07 mw., 10.55 mw., 11.18 m., 11.50 s., 11.98 mw., 12.38 s. and 12.75 w. microns. The structure of this compound was further confirmed by NMR and mass spectra determination. The NMR spectrum shows the following:

(1) Two isopropyl groups (quartet centered at 1.33 p.p.m.).
(2) One ethylene group, —$CH_2CH_2$—.
(3) One —OH group (4.75 p.p.m.).
(4) One aromatic proton (6.88 p.p.m.).
(5) Two equivalent $CH_3$ groups on a quaternary carbon (gem-dimethyl grouping, 1.37 p.p.m.).

EXAMPLE III 5,7-diisopropyl-1,1-dimethyl-6-hydroxyindan

A solution of 44 g. (0.65 mole) of isoprene in 44 g. (ca. 0.25 mole) of 2,6-diisopropylphenol was added dropwise over a 3 hour period to a rapidly stirred mixture of 45 g. (ca. 0.25 mole) of 2,6-diisopropylphenol and 55 g. of 95% phosphoric acid at 120–128°. The reaction mixture was stirred 3 hours longer at 124–127° and then allowed to cool to 100°. There was added 100 ml. of toluene and with stirring 100 ml. of water. The mixture was then allowed to settle. The lower acid layer was removed and discarded. The remaining oil layer was washed successively with 100 ml. of water and 100 ml. of sodium carbonate solution and vacuum-distilled. There was obtained 14 g., B.P. 90–105° (1 mm.); 7.0 g., B.P. 105–121° (1 mm.); 91.5 g., B.P. 121–140° (1 mm.); and 10.0 g. dark viscous residue. The principal fraction (91.5 g.), which rapidly crystallized, was analyzed by vapor-phase chromatography showing 93% of the desired 5,7-diisopropyl-1,1-dimethyl-6-hydroxyindan. The yield was 69.2% of theory based on 2,6-diisopropylphenol.

EXAMPLE IV

5,7-diisopropyl-1,1-dimethyl-6-hydroxyindan

A solution of 136 g. (2 moles) of isoprene in 356 g. (2 moles) of 2,6-diisopropylphenol was added dropwise over a 4 hour period to a rapidly stirred mixture of 356 g. (2 moles) of 2,6-diisopropylphenol and 220 g. of 95% phosphoric acid at 120–130°. The reaction mixture was stirred for 1¾ hours at 120–122° and then cooled to 20°. There was then added 90 g. of 93% sulfuric acid and the mixture stirred for 3 hours longer at 15 to 20°. The batch was quenched into 600 g. of ice-water with stirring. The separated oil was extracted with 400 ml. of toluene. The resulting solution was washed with 300 g. of 10% sodium carbonate solution and distilled. After removal of toluene the residual oil was vacuum distilled yielding: 381 g. recovered 2,6-diisopropylphenol, B.P. 82–85° (1.5 mm.); 29.5 g., B.P. 85–116° (1.5 mm.); 6.5 g., B.P. 116–118° (1.5 mm.); 336.5 g., B.P. 118–121° (1.5 mm.) which crystallized; 10.5 g., B.P. 121–145°; and 60 g. of dark viscous residue. Vapor-phase chromatographic analysis of the major fraction (336.5 g.) showed a content of 99% of the desired 5,7-diisopropyl-1,1-dimethyl-6-hydroxyindan. This and similar analyses of fractions showed a total yield of this product of 355 g. (68% of theory).

EXAMPLE V

5,7-diisopropyl-1,1-dimethyl-6-hydroxyindan

The anti-oxidant activity of 5,7-diisopropyl-1,1-dimethyl-6-hydroxyindan (DDHI) was demonstrated in various substrates.

Oleic acid: The oleic acid used was representative of commercially available material except that no stabilizer was present. The tests were conducted by two different procedures.

(a) Samples of oleic acid with and without 0.01% DDHI were agitated in open Erlenmeyer flasks on a rotary shaker at ambient temperatures. Periodically small aliquots (ca. 0.2 g.) were removed and analyzed for peroxide content by standard iodometric procedures. Results were as follows:

Peroxide Values

| Days | 7 | 20 | 46 |
|---|---|---|---|
| DDHI | 0 | 6.0 | 8.9 |
| No additive | 69.0 | 430.0 | 625.0 |

(b) Samples of oleic acid with and without 0.01% DDHI were placed in aeration tubes immersed in a water bath maintained at 60°. Purified air was continually passed through the samples at the rate of 140 ml. per minute. Periodically samples were removed and their peroxide content determined.

Peroxide Values

| Hours | 0 | 4 | 24 | 29 |
|---|---|---|---|---|
| DDHI | 0 | 3.1 | 5.9 | 10.7 |
| No additive | 0 | 12.1 | 431.0 | 491.5 |

Under both test conditions the auto-oxidation of oleic acid, as measured by peroxide formation, was markedly inhibited by the presence of 0.01% of the compound.

Aldehydes: Open jar stability tests were conducted on four different aldehyde compounds. The tests were made by exposing samples of the aldehydes with and without DDHI plus citric acid in open jars at ambient temperatures. Previous tests had demonstrated that citric acid alone had no significant effect on the rate of auto-oxidation of these materials but often enhanced the activity of phenolic stabilizers. Aliquots of these materials were periodically analyzed for acid content to determine antioxidant activity.

(a) p-Isopropyl-2-methylhydrocinnamaldehyde, Acid Values

| Days | 0 | 7 | 17 | 30 |
|---|---|---|---|---|
| 0.05% DDHI (+0.025% citric acid) | 1.1 | 10 | 25.8 | 59.4 |
| No additive | 1.1 | 54.9 | 124.4 | 204.2 |

(b) 7-hydroxy-3,7-dimethyl-octan-1-al, Acid Values

| Days | 0 | 7 | 14 | 21 | 28 |
|---|---|---|---|---|---|
| 0.025% DDHI (+0.0125% citric acid) | 0 | 8.9 | 20.2 | 22.4 | 28.0 |
| No additive | 0 | 43.7 | 84.0 | 114.2 | 123.0 |

(c) Nonanal, Acid Values

| Days | 0 | 7 | 14 | 21 | 28 |
|---|---|---|---|---|---|
| 0.05% DDHI (+0.025% citric acid) | 1.1 | 88.9 | 16.8 | 25.8 | 34.7 |
| No additive | 1.1 | 125.4 | 213.9 | 269.0 | 305.4 |

(d) p-Isopropyl benzaldehyde, Acid Values

| Days | 0 | 7 | 14 | 28 |
|---|---|---|---|---|
| 0.05% DDHI (+0.025% citric acid) | 0 | 2.2 | 3.4 | 7.8 |
| No additive | 0 | 39.2 | 49.3 | 58.2 |

(e) Olefins

Open jar stability tests were conducted with 7-methyl-3-methylene-1,6-octadiene (myrcene) using peroxide analysis to determine auto-oxidation rate.

Peroxide Values

| Days | 0 | 7 | 18 | 39 | 47 |
|---|---|---|---|---|---|
| 0.025% DDHI (+0.0125% citric acid) | 0 | 0 | 0 | 5.3 | 8.9 |
| No additive | 0 | 111.0 | 310.0 | 656.0 | 730.0 |

These results showed that DDHI was an effective stabilizer for aldehydes and olefins.

EXAMPLE VI

1,1-dimethyl-5,7-diisopropyl-6-hydroxyindan in a Rose perfume 1,1-dimethyl-5,7-diisopropyl-6-hydroxyindan, DDHI, has a clean musk odor with a slight ambrette seed note. The following Rose perfume composition demonstrates its fixative value.

| | Parts |
|---|---|
| Citronellol | 243 |
| β-Phenylethyl alcohol | 116 |
| Geraniol | 254 |
| Rhodinol | 96 |
| Laurine ® | 126 |
| Guaiacwood concrete | 13 |
| Eugenol | 6 |
| Irisone ® | 58 |
| Cinnamic alcohol | 5 |
| Phenylacetic acid | 1 |
| Undecylenic aldehyde | 1 |
| 2-trichloromethyl benzyl acetate | 46 |
| Citral | 24 |
| Folione,® 10% in diethylphathalate | 1 |
| DDHI | 10 |
| | 1,000 |

Laurine is the registered trademark of Givaudan Corporation for its brand of hydroxycitronellal.

Irisone is the registered trademark of Givaudan Corporation for its brand of alpha-ionone.

Folione is the registered trademark of Givaudan Corporation for its brand of methyl heptine carbonate.

The formulation was tested with and without the musk compound from concentrations of 0.1 to 5% by weight. The preferred 1% concentration of DDHI enhanced the floral character of the composition giving sweetness, warmth and body to the fragrance. A marked improvement was noted over the composition with DDHI both in terms of odor quality and stability after several months storage.

While this invention has been described in detail in its presently preferred embodiments, it will be obvious to those skilled in the art that various changes and modifications may be made therein, particularly in the processing conditions and in the formulations employed, without departing from the spirit of our invention. We aim in the appended claim to cover all such changes and modifications.

We claim:
1. 5,7-diisopropyl-1,1-dimethyl-6-hydroxyindan.

References Cited

UNITED STATES PATENTS

| 2,793,239 | 5/1957 | Toland | 260—624 |
| 2,969,343 | 1/1961 | Morris | 260—621 |

OTHER REFERENCES

Cleo et al.: "Chem. Society Jr." (1955), pp. 4347–49.
Isagul'yant et al.: "Chem. Abs.," vol. 62: 14614a.
Isagul'yant et al.: "Chem. Abs.," vol. 62: 14545c.
Givaudan: "Chem. Abs.," vol. 65 (1966), pp. 7118a–7119a.

BERNARD HELFIN, Primary Examiner

W. B. LONE, Assistant Examiner

U.S. Cl. X.R.

252—40, 522; 260—621, 526 N, 599, 601 R, 666.5, 395.5